(12) United States Patent
Shin et al.

(10) Patent No.: US 9,863,847 B2
(45) Date of Patent: Jan. 9, 2018

(54) STANDARD ENGINE COLD TEST SYSTEM AND METHOD

(71) Applicant: Hyundai Motor Company, Seoul (KR)

(72) Inventors: Ho Jae Shin, Hwaseong-si (KR); Joong Cheol Nam, Ulsan (KR); Jong Gu Do, Daegu (KR)

(73) Assignee: Hyundai Motor Company, Seoul (KR)

( * ) Notice: Subject to any disclaimer, the term of this patent is extended or adjusted under 35 U.S.C. 154(b) by 199 days.

(21) Appl. No.: 14/486,689

(22) Filed: Sep. 15, 2014

(65) Prior Publication Data

US 2015/0316445 A1 Nov. 5, 2015

(30) Foreign Application Priority Data

May 2, 2014 (KR) .................. 10-2014-0053395

(51) Int. Cl.
*G01M 15/04* (2006.01)
*F02D 19/02* (2006.01)
*G01M 15/05* (2006.01)
*G01M 15/02* (2006.01)

(52) U.S. Cl.
CPC ......... *G01M 15/044* (2013.01); *F02D 19/025* (2013.01); *G01M 15/02* (2013.01); *G01M 15/042* (2013.01); *G01M 15/05* (2013.01)

(58) Field of Classification Search
CPC .. G01M 15/044; G01M 15/05; G01M 15/042; G01M 15/02; F02D 19/025
See application file for complete search history.

(56) References Cited

U.S. PATENT DOCUMENTS

| 4,907,176 A | * | 3/1990 | Bahnick | G01M 15/05 701/34.3 |
| 5,361,628 A | | 11/1994 | Marko et al. | |
| 5,596,153 A | * | 1/1997 | Bulgrien | F16F 15/123 73/862.191 |
| 5,761,626 A | | 6/1998 | Tascillo et al. | |
| 7,849,734 B2 | * | 12/2010 | Moritani | G01M 15/02 73/116.02 |

(Continued)

FOREIGN PATENT DOCUMENTS

| JP | 09-229824 A | 9/1997 |
| JP | 2000-111452 A | 4/2000 |
| JP | 2008-520970 A | 6/2008 |

(Continued)

OTHER PUBLICATIONS

Korean Notice of Allowance issued in Application No. 10-2014-0053395 dated May 23, 2016.

*Primary Examiner* — Peter Macchiarolo
*Assistant Examiner* — Anthony W Megna Fuentes
(74) *Attorney, Agent, or Firm* — McDermott Will & Emery LLP (57) ABSTRACT

A standard engine cold test method includes instructing, by a control device, a tester to perform an engine test. The tester drives a motor with a standard mode or a general mode according to a control of the control device to operate an engine which is a test object. The tester measures engine information depending on an operation of the engine using a sensor. A gathering device gathers the measured engine information. The gathered engine information is analyzed to determine abnormality of the engine.

19 Claims, 5 Drawing Sheets (56) References Cited

U.S. PATENT DOCUMENTS

2009/0132182 A1    5/2009   Fredriksson et al.
2009/0198474 A1    8/2009   Fritz et al.

FOREIGN PATENT DOCUMENTS

| JP | 2009-168812 A | | 7/2009 |
|----|---------------|---|--------|
| KR | 10-2008-0053756 A | | 6/2008 |
| KR | 20080053756 A | * | 6/2008 |
| KR | 10-2009-0131565 A | | 12/2009 |
| WO | 2005/057159 A1 | | 6/2005 |

* cited by examiner

STANDARD ENGINE COLD TEST SYSTEM AND METHOD

CROSS-REFERENCE TO RELATED APPLICATION

This application is based on and claims the benefit of priority to Korean Patent Application No. 10-2014-0053395, filed on May 2, 2014 in the Korean Intellectual Property Office, the entire content of which is incorporated herein by reference.

TECHNICAL FIELD

The present inventive concept relates to a standard engine cold test system and a method of gathering and analyzing the same measurement value independent of cold test motor sizing by standardizing starting torque and rotating torque measurement for each engine so as to determine abnormality of an engine.

BACKGROUND

Generally, a crank shaft of a completed engine is a shaft which converts a vertical motion of a piston moving by a combustion operation of an engine into a rotational motion to deliver power to a transaxle. When a bearing of the crank shaft is wrongly assembled or is introduced with foreign materials, a load is generated at the time of driving the crank shaft and therefore a sampling test is performed by a hot test.

The engine test according to the related art performs a driving test of the crank shaft in a cold state but is on the level of measuring a simple load while the crank shaft is driven. Further, since motor specifications of testers are different and therefore measurement values for the same kinds of machines are different for each tester, the related art may not directly compare between data measured by different testers.

SUMMARY

The present inventive concept has been made to solve the above-mentioned problems occurring in the prior art while advantages achieved by the prior art are maintained intact.

An aspect of the present inventive concept provides a standard engine cold test system and a method of gathering and analyzing the same measurement value independent of cold test motor sizing by standardizing starting torque and rotating torque measurement for each engine so as to determine engine abnormality.

One aspect of the present inventive concept relates to a standard engine cold test system including a control device, a tester, a gathering device and an analysis device. The control device is configured to control an engine test operation. The tester is configured to operate an engine by driving a motor according to a control of the control device and measure engine information depending on an operation of the engine. The gathering device is configured to gather the engine information outputted from the tester. The analysis device is configured to analyze the engine information gathered by the gathering device to determine abnormality of the engine.

The control device may include a main controller configured to generate and transmit a measurement command, and a driving controller configured to control a motor starting mode with a standard mode or a general mode according to the measurement command.

The measurement command may include a measurement mode and a kind of measurement data.

The measurement mode may be classified into a standard measurement mode which is based on a measurement standard and a general measurement mode which is not based on the measurement standard.

When the measurement mode of the measurement command is the standard measurement mode, the driving controller may determine the motor starting mode as the standard mode and change driving control setting information to standard control setting information for controlling a standardized motor driving according to a kind of engine.

When the measurement mode of the measurement command is the general measurement mode, the driving controller may determine the motor starting mode as the general mode and set the driving control setting information as a default value.

The driving control setting information may include a motor slope, a motor speed, and a motor speed gain.

The tester may include a motor, a motor driver and a sensor. The motor may be configured to be connected with the engine and deliver power to the engine. The motor driver may be configured to drive the motor according to the control of the driving controller. The sensor may be configured to measure engine information depending on the operation of the engine.

The engine information may include at least one of starting torque and rotating torque.

The analysis device may check whether the gathered engine information is out of a threshold range. When it is determined that the engine information is out of the threshold range, the analysis device may determine that the engine is abnormal.

The threshold range may be within ±20% from a reference value.

The analysis device may be configured to overlappingly display data for each of a plurality of factories for a certain type of engine to compare performance of the certain type of engine between factories.

The analysis device may be configured to visualize and display starting and rotating torques for each of plurality of engines produced in a factory.

Another aspect of the present inventive concept encompasses a standard engine cold test method, including instructing, by a control device, a tester to perform an engine test. The tester drives a motor according to a control of the control device to operate an engine which is a test object. The tester measures engine information depending on an operation of the engine using a sensor. The gathering device gathers the measured engine information. The gathered engine information is analyzed to determine abnormality of the engine.

The instructing to perform the test may include generating, by the control device, a measurement command depending on a user input; and setting, by the control device, a motor starting mode depending on the measurement command.

In the setting of the motor starting mode, when the measurement mode in the measurement command is a standard measurement mode, a motor starting mode may be set to be a standard mode.

The standard mode setting may be changed to standard driving control setting information for controlling standardized motor driving according to a kind of engine.

In the determining of the abnormality of the engine, it may be checked whether the gathered engine information is out of a threshold range and if it is determined that the engine information is out of the threshold range, it may be determined that the engine is abnormal.

The threshold range may be within ±20% from a reference value.

Data for each of a plurality of factories for a certain type of engine may be overlappingly displayed to compare performance of the certain type of engine between factories. Starting and rotating torques for each of plurality of engines produced in a factory may be visualized and displayed.

BRIEF DESCRIPTION OF THE DRAWINGS

The above and other objects, features and advantages of the present inventive concept will be more apparent from the following detailed description taken in conjunction with the accompanying drawings.

DETAILED DESCRIPTION

Hereinafter, exemplary embodiments of the present inventive concept will be described with reference to the accompanying drawings.

Figure 1:
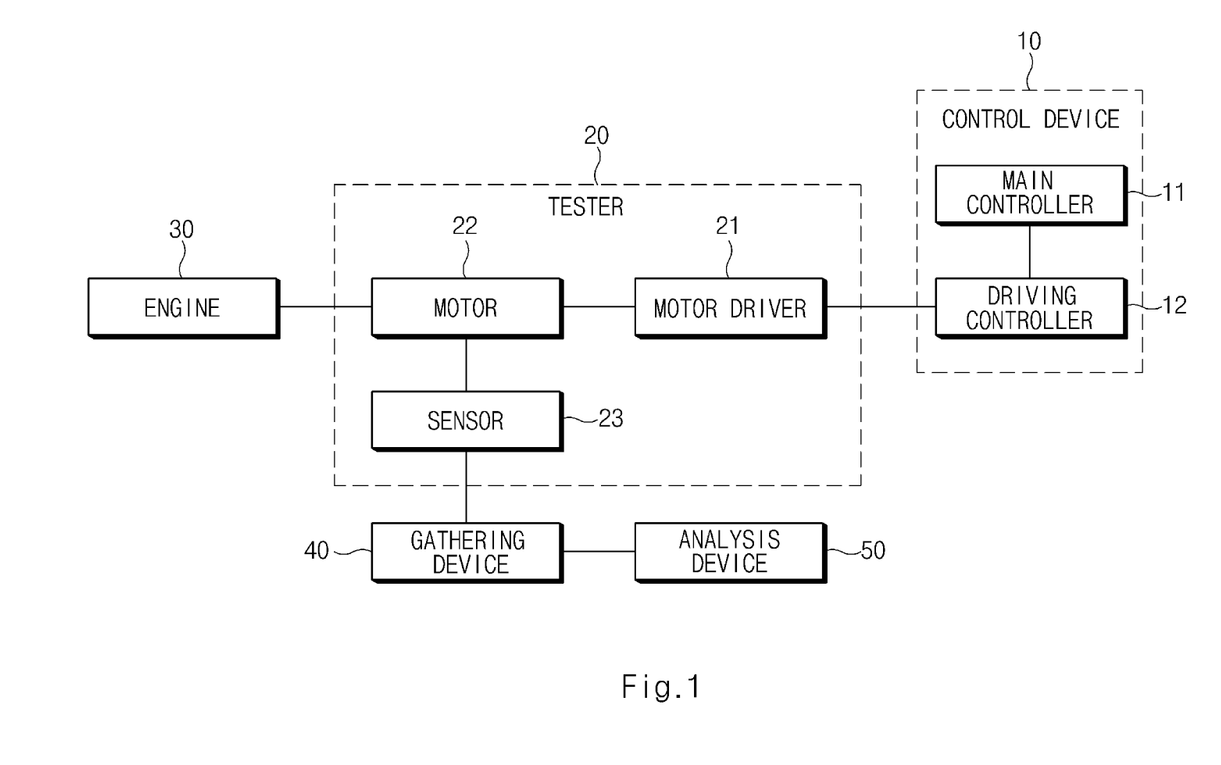
FIG. 1 is a block diagram illustrating a standard engine cold test system according to an exemplary embodiment of the present inventive concept.

FIG. 1 is a block diagram illustrating a standard engine cold test system according to an exemplary embodiment of the present inventive concept.

As illustrated in FIG. 1, the standard engine cold test system may include a control device 10, a tester 20, an engine 30, a gathering device 40, and an analysis device 50.

The control device 10 may serve to control a process of performing an engine test. The control device 10 may include a main controller 11 and a driving controller 12.

The main controller 11 may control an engine test operation according to a user input and generate and transmit a measurement command including a measurement mode, e.g., test mode, and a kind of measurement data. Herein, the measurement mode may be classified into a standard measurement mode which is based on a measurement standard and a general measurement mode which is not based on the measurement standard. The kind of measurement data may include a starting torque and a rotating torque.

The driving controller 12 may determine a motor starting mode depending on the measurement command which is inputted from the main controller 11. That is, when the measurement mode of the measurement command is the standard measurement mode, the driving controller 12 may determine the motor starting mode as a standard starting mode, e.g., standard mode. When the measurement mode of the measurement command is the general measurement mode, the driving controller 12 may determine the motor starting mode as a general starting mode, e.g., general mode.

When the motor starting mode is determined as the general mode, the driving controller 12 may drive a motor 22 depending on driving control setting information which is set as a default according to a kind of engine. Meanwhile, when the motor starting mode is determined as the standard mode, the driving controller 12 may change the driving control setting information to standard control setting information. Herein, the standard control setting information may be information for controlling standardized motor driving according to the kind of engine. The standard control setting information may be previously set by a user using an experimental value, and the like. Further, the driving control setting information may include a motor slope, a motor speed, and a motor speed gain. The motor slope may refer to a time it takes for revolutions per minute of a motor to reach 2000 rpm (revolution pre minute).

For example, when the motor slope, the motor speed, and the motor speed gain, which are the standard control setting information, are each set to be 31 seconds, 200 rpm, and 60 value, the driving controller 12 may change the motor slope, the motor speed, and the motor speed gain of the driving control setting information, respectively, to 31 seconds, 200 rpm, and 60.

Further, when the standard starting torque is measured, the driving controller 12 may change only the motor slope and the motor speed to the standard control setting information. When the standard rotating torque is measured, the driving controller 12 may change the motor speed gain to the standard control setting information.

The tester 20 may perform the engine test using the general mode or the standard mode according to the control of the control device 10. The tester 20 may include a motor driver 21, the motor 22, and a sensor 23.

The motor driver 21 may drive the motor 22 using the general mode or the standard mode according to the control of the driving controller 12. That is, the motor driver 21 may drive the motor 22 based on the general control setting information or the standard control setting information.

The motor 22 may be driven according to the control of the motor driver 21 and may operate the engine 30. That is, the motor 22 may be to drive the engine 30 without combusting fuel.

The sensor 23 may measure the starting torque and the rotating torque using a torque sensor which is installed in a crank shaft module of the engine 30. The sensor 23 may include a vibration sensor, a crank position sensor, and the like, in addition to a torque sensor.

The engine 30 may include the crank shaft module which converts a vertical motion of a piston moving by a combustion action into a rotational motion. The crank shaft module of the engine 30 may be connected to the motor 22 of the tester 20 and thus may be operated by power generated from the motor 22.

The gathering device 40 may gathers data, e.g., starting torque and rotating torque, measured by each sensor 23.

The gathering device 50 may analyze the measurement data gathered by the gathering device 40 to determine abnormality of the engine 30. In this case, the analysis device 50 may check whether the measurement data are out of a threshold range and if it is determined that the measurement data are out of the threshold range, the analysis device 50 may determine the abnormality of the engine. Herein, the threshold range may be within ±20% from a reference, e.g., a reference value. Further, the analysis device 50 may also gather, compare, and analyze data measured by different testers.

Figure 2:
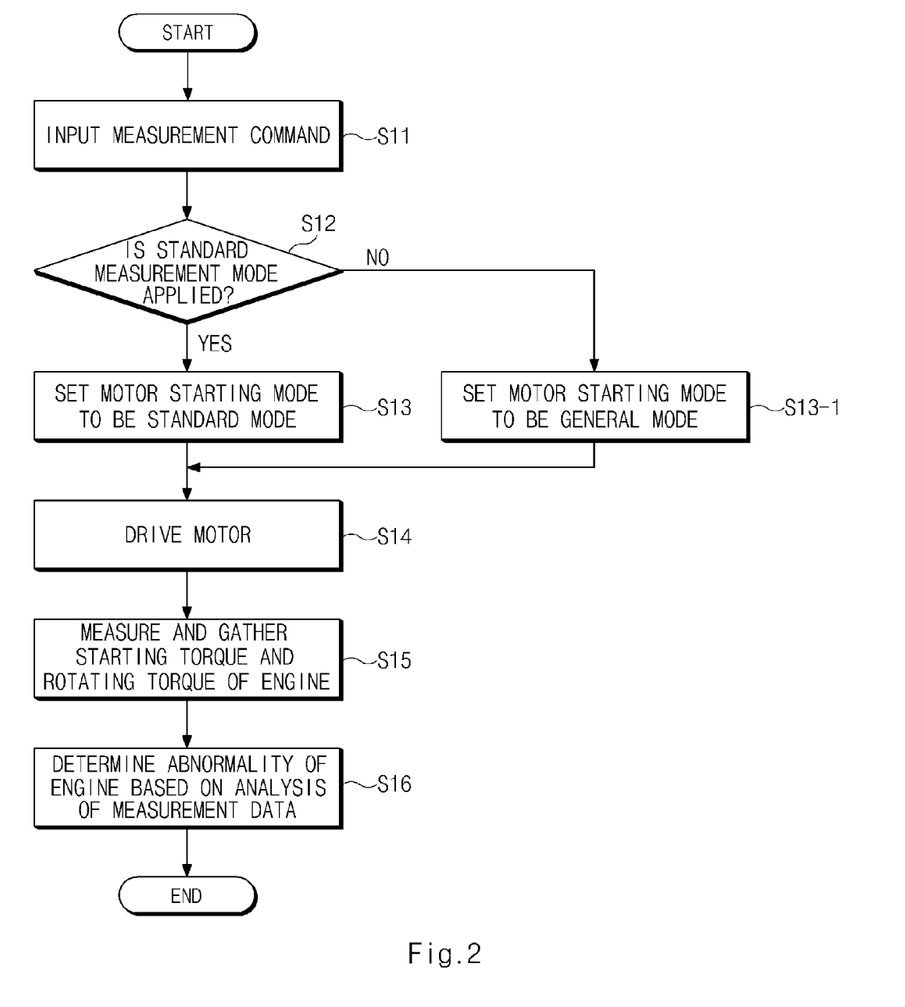
FIG. 2 is a flow chart illustrating a standard engine cold test method according to an exemplary embodiment of the present inventive concept.

FIG. 2 is a flow chart illustrating a standard engine cold test method according to an exemplary embodiment of the present inventive concept.

First, the driving controller 12 of the control device 10 may receive, as an input, the measurement command transmitted from the main controller 11 (S11). Herein, the measurement command may include the measurement mode and the kind of measurement data, in which the measurement mode is classified into the standard measurement mode and the general measurement mode, and the kind of measurement data is classified into the starting torque and the rotating torque.

The driving controller 12 may check whether the measurement command instructs the application of the standard measurement mode (S12). In other words, the driving controller 12 may check whether the measurement mode included in the measurement command is the standard measurement mode or the general measurement mode.

When the measurement command instructs the application of the standard measurement mode, the driving controller 12 may change the motor starting mode to the standard mode (S13) In this case, the driving controller 12 may change the motor driving control setting information to the standard control setting information. Herein, preset information for each engine may be used as the standard control setting information.

Meanwhile, when the measurement command does not instruct the application of the standard measurement mode, the driving controller 12 may change the motor starting mode to the general mode (S13-1). Next, the driving controller 12 may drive the motor 22 to operate the engine 30.

The driving controller 12 may drive the motor 22 with the changed standard mode (S14). The motor 22 may deliver power generated by the driving to the engine 30 to operate the engine 30.

The gathering device 40 may gather the starting torque and/or the rotating torque of the engine 30 which is measured by the sensor 23 (S15). That is, the gathering device 40 may gather the engine information which is measured by a sensor. The gathering device 40 may gather the data measured by the sensor 23 through wired communication or wireless communication with a tester 20.

The analysis device 50 may analyze the starting torque and/or the rotating torque received from the gathering device 40 to determine the abnormality of the engine (S16). The analysis device 50 may analyze the engine information, e.g., starting torque, rotating torque, gathered through the gathering device 40 to determine the abnormality of the engine 30. In this case, the analysis device 50 may check whether the measurement data are out of a threshold range and if it is determined that the measurement data are out of the threshold range, the analysis device 50 may determine the abnormality of the engine. Herein, the threshold range may be within ±20% from a reference, e.g., a reference value.

Figure 3A:
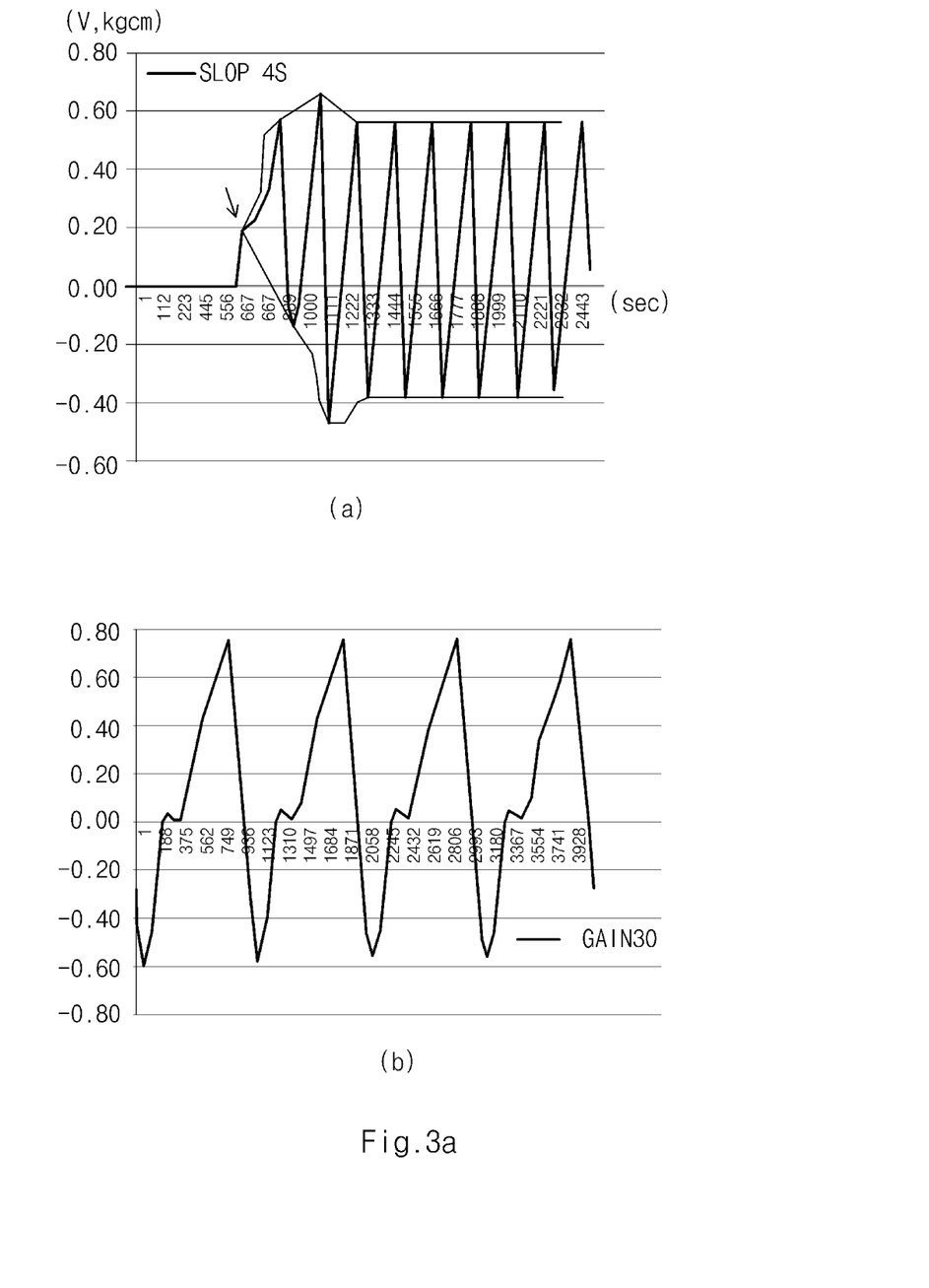
FIG. 3A is a diagram illustrating a detection waveform measured by a general measurement mode associated with the present inventive concept.
Figure 3B:
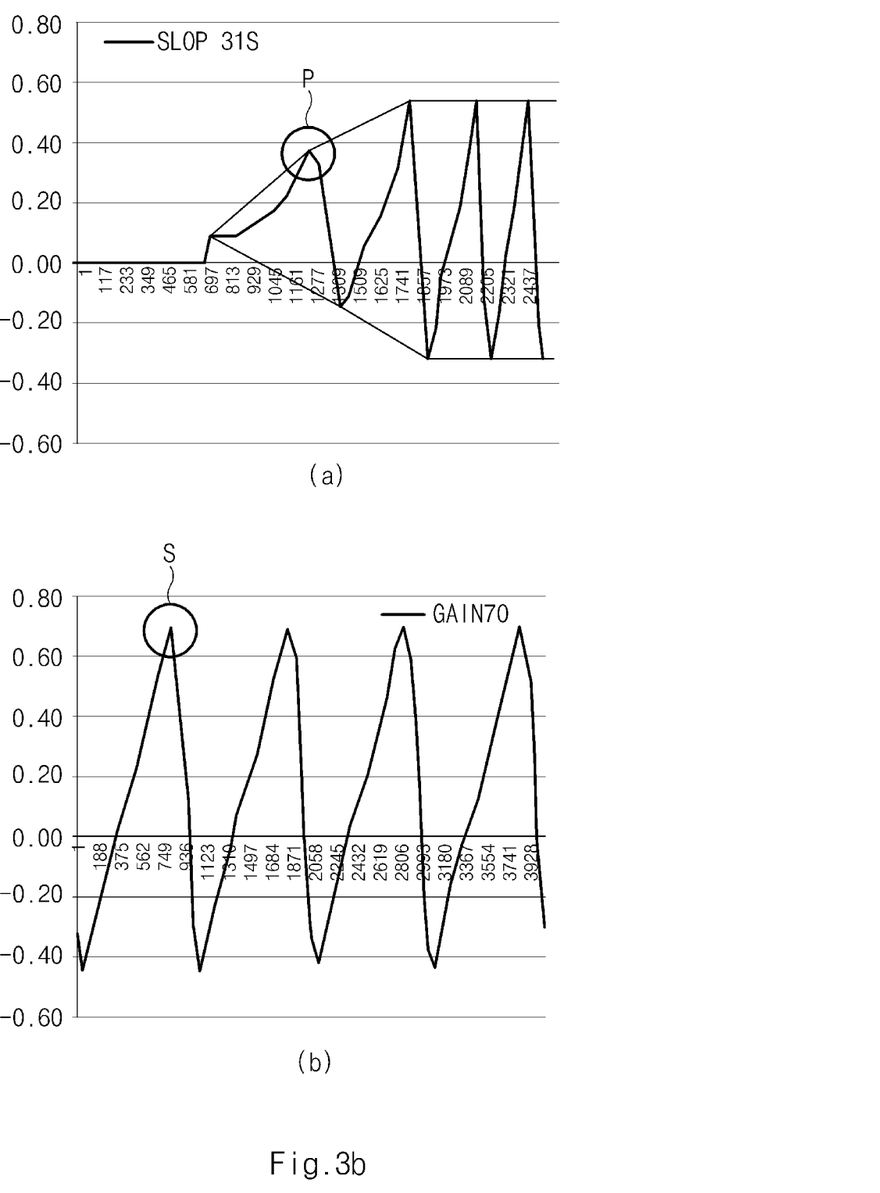
FIG. 3B is a diagram illustrating a detection waveform measured by a standard measurement mode associated with the present inventive concept.

FIG. 3A is a diagram illustrating a detection waveform measured by the general measurement mode associated with the present inventive concept and FIG. 3B is a diagram illustrating a detection waveform measured by the standard measurement mode associated with the present inventive concept.

In FIG. 3A, (a) illustrates a starting torque waveform when the motor slope is 4 seconds and (b) illustrates a measured rotating torque waveform when the motor speed gain is 30.

Here, (a) and (b) of FIG. 3B illustrate the starting torque and rotating torque waveforms which are measured in the state in which the motor slope is 31 seconds and the motor speed gain is 70. Comparing FIG. 3A with FIG. 3B, it is possible to obtain a more stable waveform in the measurement case by the standard measurement mode than in the measurement case by the general measurement mode.

In the measurement case by the standard measurement mode, the analysis device 50 may extract and compare any characteristic values from the measured waveforms for the same kinds of machines between factories. For example, as illustrated in FIG. 3B, a first peak coordinate and coordinate values of P and S are extracted as characteristic values, which are compared with the characteristic values extracted by the same method in another factory.

Figure 4:
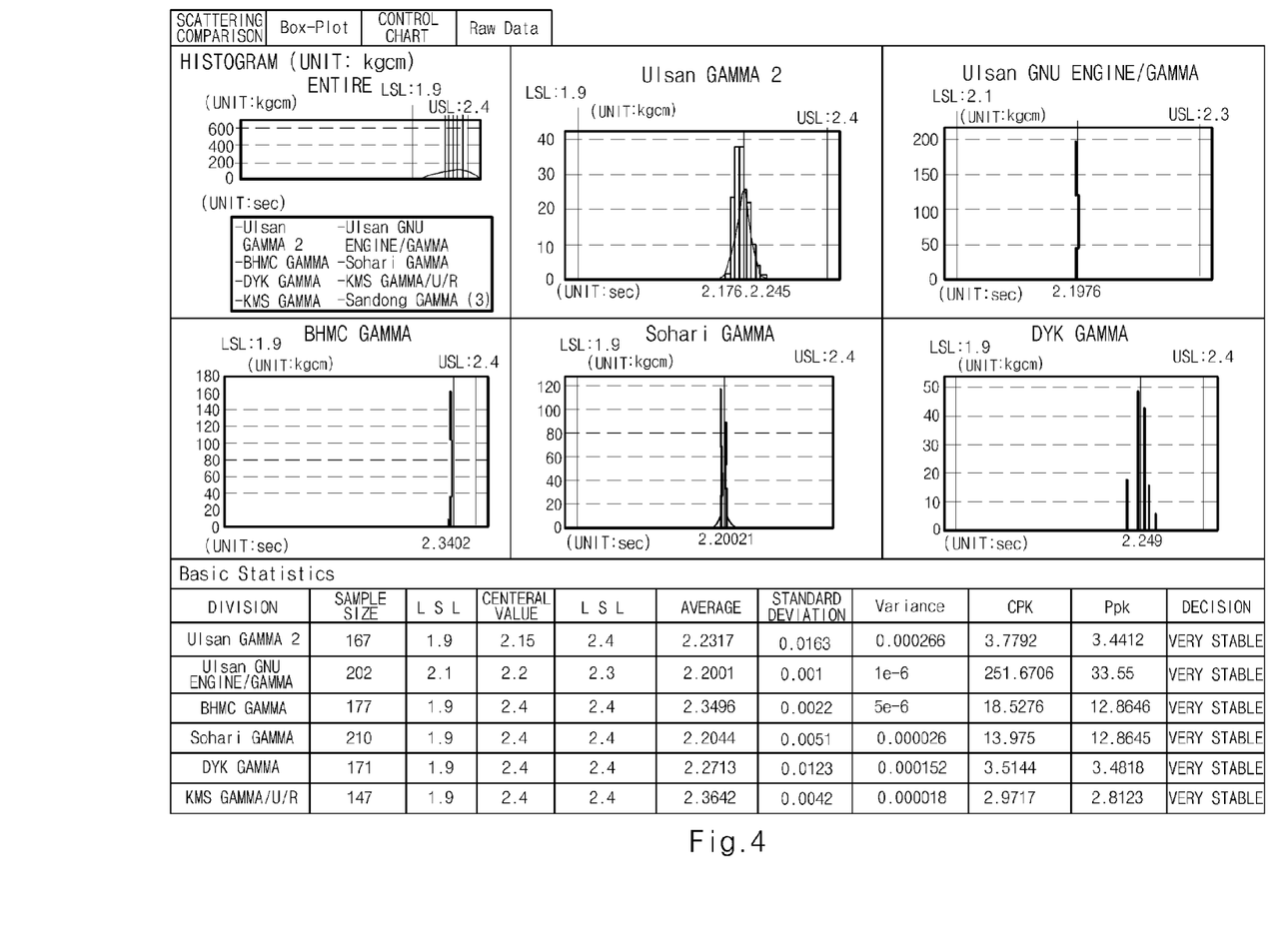
FIG. 4 is a diagram illustrating an example of an output screen of a comparison result of cold test data between factories according to an exemplary embodiment of the present inventive concept.

FIG. 4 is a diagram illustrating an example of an output screen of a comparison result of cold test data between factories according to the present inventive concept.

As illustrated in FIG. 4, the analysis device 50 may overlappingly display data for each factory for the same kinds of engines to compare the performance difference of the production engine between factories. Further, the analysis device 50 may visualize and display the starting and rotating torques for each engine produced in a factory.

According to exemplary embodiments of the present inventive concept, it is possible to quantitatively measure and analyze the crank shaft driving load of the engine by standardizing the starting torque and rotating torque measurement for each engine.

Therefore, according to exemplary embodiments of the present inventive concept, it is possible to obtain the same value even in the tester in which the motor sizing is different and determine the driving level of the crank shaft of the engine based on the same reference, e.g., the same reference value.

Hereinabove, although exemplary embodiments of the present inventive concept are illustrated and described, the present inventive concept is not limited to the aforementioned exemplary embodiment and it is apparent that various modifications can be made to those skilled in the art without departing from the spirit of the present inventive concept described in the appended claims and the modified embodiments are not to be individually understood from the technical spirit and prospects of the present inventive concept.

What is claimed is:

1. A standard engine cold test system, comprising: a control device configured to control an engine test operation; a tester configured to operate an engine by driving a motor according to a control of the control device and measure engine information depending on an operation of the engine; a gathering device configured to gather the engine information outputted from the tester; and an analysis device configured to analyze the engine information gathered by the gathering device to determine abnormality of the engine, wherein the control device is configured to drive the motor depending on standard control setting information for controlling a standardized motor driving according to a kind of engine, wherein the analysis device is configured to extract characteristic values from waveforms measured by the tester when controlling the standardized motor driving in one factory, and to compare the characteristic values with characteristic values extracted by another tester in another factory, and wherein the control device is configured to change a motor slope and a motor speed according to the standard control setting information when a standard starting torque is measured, and the control device is further configured to change a motor speed gain according to the standard control setting information when a standard rotating torque is measured.

2. The standard engine cold test system according to claim 1, wherein the control device includes:
   a main controller configured to generate and transmit a measurement command; and
   a driving controller configured to set a motor starting mode according to the measurement command.

3. The standard engine cold test system according to claim 2, wherein the measurement command includes a measurement mode and a kind of measurement data.

4. The standard engine cold test system according to claim 3, wherein the measurement mode is classified into a standard measurement mode which is based on a measurement standard and a general measurement mode which is not based on the measurement standard.

5. The standard engine cold test system according to claim 4, wherein when the measurement mode of the measurement command is the standard measurement mode, the driving controller changes driving control setting information to standard control setting information for controlling the standardized motor driving according to a kind of engine.

6. The standard engine cold test system according to claim 4, wherein when the measurement mode of the measurement command is the general measurement mode, the driving controller is further configured to set the driving control setting information as a default value.

7. The standard engine cold test system of claim 5, wherein the driving control setting information includes the motor slope, the motor speed, and the motor speed gain.

8. The standard engine cold test system according to claim 1, wherein the tester includes:
   the motor configured to be connected with the engine and deliver power to the engine;
   a motor driver configured to drive the motor according to the control of a driving controller; and
   a sensor configured to measure engine information depending on the operation of the engine.

9. The standard engine cold test system according to claim 8, wherein the engine information includes at least one of starting torque and rotating torque.

10. The standard engine cold test system according to claim 1, wherein: the analysis device is further configured to check whether the gathered engine information is out of a threshold range, and when it is determined that the engine information is out of the threshold range, the analysis device is further configured to determine that the engine is abnormal.

11. The standard engine cold test system according to claim 10, wherein the threshold range is within ±20% from a reference value.

12. The standard engine cold test system according to claim 1, wherein the analysis device is configured to display data for a certain type of engine produced in the one factory and the another factory to compare performance of the certain type of engine between the one factory and the another factory.

13. The standard engine cold test system according to claim 1, wherein the analysis device is configured to visualize and display starting and rotating torques for each of plurality of engines produced in the one factory and the another factory.

14. A standard engine cold test method, comprising:
   instructing, by a control device, a tester to perform an engine test; driving, by the tester, a motor according to a control of the control device to operate an engine which is a test object; measuring, by the tester, engine information depending on an operation of the engine using a sensor; gathering, by a gathering device, the measured engine information; and analyzing, by an analysis device, the gathered engine information to determine abnormality of the engine, wherein the control device is configured to drive the motor depending on standard control setting information for controlling a standardized motor driving according to a kind of engine, wherein the analysis device is configured to extract characteristic values from waveforms measured by the tester when controlling the standardized motor driving in one factory, and to compare the characteristic values with characteristic values extracted by another tester in another factory, and wherein the control device is further configured to change a motor slope and a motor speed according to the standard control setting information when a standard starting torque is measured, and the control device is further configured to change a motor speed gain according to the standard control setting information when a standard rotating torque is measured.

15. The standard engine cold test method according to claim 14, wherein the instructing to perform the test includes:
   generating, by the control device, a measurement command depending on a user input; and
   setting, by the control device, a motor starting mode depending on the measurement command.

16. The standard engine cold test method according to claim 15, wherein the setting of the motor starting mode includes setting, when a measurement mode in the measurement command is a standard measurement mode, the motor starting mode to be a standard mode.

17. The standard engine cold test method according to claim 14, wherein the determining of the abnormality of the engine includes checking whether the gathered engine information is out of a threshold range and determining, when it is determined that the engine information is out of the threshold range, that the engine is abnormal.

18. The standard engine cold test method according to claim 17, wherein the threshold range is within ±20% from a reference value.

19. The standard engine cold test method according to claim 14, further comprising:
   displaying data for a certain type of engine produced in the one factory and the another factory; and
   visualizing and displaying starting and rotating torques for each of plurality of engines produced in the one factory and the another factory.

* * * * *